INVENTORS
BRUCE E. TINLING
VERNON K. MERRICK

INVENTORS
BRUCE E. TINLING
VERNON K. MERRICK

BY
ATTORNEYS

Nov. 1, 1966   B. E. TINLING ETAL   3,282,532
STABILIZATION OF GRAVITY ORIENTED SATELLITES
Filed July 27, 1964   3 Sheets-Sheet 3

*INVENTORS*
BRUCE E. TINLING
VERNON K. MERRICK

BY
ATTORNEYS

United States Patent Office 3,282,532
Patented Nov. 1, 1966

3,282,532
STABILIZATION OF GRAVITY ORIENTED SATELLITES
Bruce E. Tinling and Vernon K. Merrick, Los Altos Hills, Calif., assignors to the United States of America as represented by the Administrator of the National Aeronautics and Space Administration
Filed July 27, 1964, Ser. No. 385,527
14 Claims. (Cl. 244—1)

The invention described herein may be manufactured and used by or for the Government of the United States of America for governmental purposes without the payment of any royalties thereon or therefor.

This invention relates to the stabilization of satellites and more particularly to the passive stabilization of gravity oriented satellites.

In many satellite uses it is essential that some means be provided to maintain the satellite attitude in a specific orientation with respect to the earth or other body around which it is in orbit. For example, communication and observation satellites must keep one side pointed earthward at all times. Initial proposals for stable orientation of satellites were based upon motor-driven arrangements of various types.

It is well known that the force of gravity will cause the axis of minimum moment of inertia of a satellite to point toward the earth throughout the orbital path of the satellite. The axis or line which points to the earth or other body about which the satellite is orbiting will also be referred to herein as the "local vertical." This phenomenon is caused by the fact that the force of gravity diminishes as a function of the square of the distance from the earth. Use of this phenomenon has been proposed for orienting satellites and is referred to as "gravity-gradient" orientation.

The problem with gravity-gradient orientation is primarily one of stabilization. When the satellite is disturbed from its gravity oriented position, or before it settles to such a position upon initial launching, the gravity-gradient will exert an earth orienting torque tending to force the axis of minimum moment of inertia to point to the earth. Similarly, gyroscopic forces will tend to force the axis of maximum moment of inertia into a position normal to the orbital plane. The difficulty arises from the fact that when the gravity-gradient and gyroscopic orienting forces act on the satellite to orient the axes of minimum and maximum moment of inertia they inherently overcorrect. Thus, an oscillating condition is set up and will last relatively indefinitely because there is substantially no damping force in space.

The problem of stabilization of gravity oriented satellites has been recognized in the past, and proposals have been made for solving the problem. One of the most interesting proposals is a passive stabilization system involving a plurality of damper rods pivotally attached to the satellite. Means are provided for damping the oscillatory motion of each of the rods relative to the satellite. One of the damper rods is positioned on the pitch axis to damp out oscillation about the roll axis; one is positioned on the roll axis to damp out oscillation about the pitch axis; and both rods are interconnected so that relative motion between them damps out motion about the yaw axis. Such a prior proposal is described in an article by Lawrence J. Kamm, entitled "An Improved Satellite Orientation Device," American Rocket Society Journal, vol. 32, June 1962.

It is an object of the present invention to provide a gravity-oriented satellite having an improved system for passive stabilization.

More specifically an object of the invention is to provide a gravity-oriented satellite in which a single damper rod serves to damp oscillations about all of the three orthogonal axes of pitch, roll, and yaw. Obviously, the single-damper-rod solution is less expensive, more reliable and lighter than the prior system employing two damper rods.

By way of brief description a satellite according to the invention is constructed to have a first axis of minimum moment of inertia, a second axis of maximum moment of inertia at right angles to said first axis, and a single damper rod pivotally attached to the main body of the satellite. The damper rod, or auxiliary body, is a part of the satellite and contributes to the formation of the axes of minimum and maximum moment of inertia of the composite satellite structure. Damping means are provided to damp oscillations of the rod relative to the main body of the satellite. The main body of the satellite is so constructed and the damper rod is so attached that in its equilibrium position the damper rod is at an angle to the axis of maximum moment of inertia of the composite structure, and said angle is other than 90 degrees.

The basis for the ability of a single damper rod to provide damping about all three of the orthogonal axes of motion lies in the condition that the damper rod in equilibrium position must be at an angle other than 90 degrees to the axis of maximum moment of inertia of the composite satellite structure. The purpose and result of the asymmetrical position of the damper rod is that the axis of maximum moment of inertia of the main body, per se, will be skewed to the axis of maximum moment of inertia of the composite body. As a result, inertial coupling is obtained and will insure relative motion between the damper rod and the remainder of the satellite regardless of the axis about which the satellite is displaced, as will be hereinafter discussed in more detail. It is of course the damped relative motion between the damper rod and the remainder of the satellite which dissipates energy and damps out oscillations.

The various objects and features of advantage of the invention will be described in more detail in the following detailed description wherein reference is made to the accompanying drawings, in which.

Figure 1:
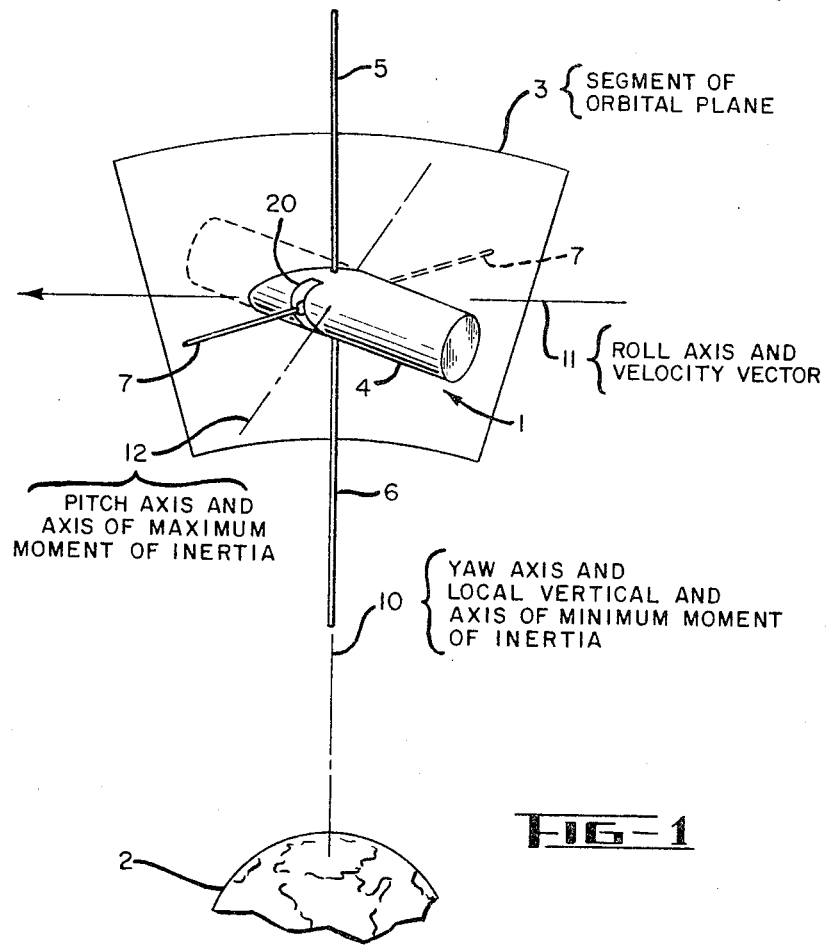
FIG. 1 is a diagrammatic perspective representation of a satellite according to the invention in orbit around the earth.

The various drawing figures show a number of different shapes a satellite might embody within the practice of the invention. It should be understood that the specific shapes shown in the drawings are merely by way of example and are not in any way intended as depicting all possible shapes. Further, it should be understood that the main teaching of the drawings is intended to be one of mass distribution rather than a matter of specific external shapes. In other words, the drawings depict a few of the external shapes a satellite might have if it were made from a homogenous solid material. It will become apparent from the following description and examples that the basic requirement is one of mass distribution, and that the required distribution can be achieved with an infinite variety of external shapes.

Referring in more detail to the drawings, FIG. 1 depicts a satellite 1 in orbit around the earth 2. For reference purposes a segment of the orbital plane is included and labeled with the reference number 3. The complete satellite construction comprises a cylindrical body 4, a pair of axis-forming rods 5 and 6 rigidly attached to body 4, and a damper rod 7 pivotally attached to body 4. The axis-forming rods 5 and 6 are aligned with each other and project from opposite sides of the satellite body at right angles to the center line of the cylinder 4. Obviously, rods 5 and 6 could be replaced by a single rod extending through body 4.

As is well known by those skilled in the art, the fact that the force of gravity decreases with the square of the distance from the earth causes the axis of minimum moment of inertia of the satellite to point toward the earth. The mass and length of rods 5 and 6 are selected so that the complete satellite structure will have a very pronounced axis of minimum moment of inertia and that such axis will be in line with rods 5 and 6. Thus, when satellite 1 is in orbit, the rods 5 and 6 will always tend to be aligned along the earth-pointing axis 10. Axis 10 is identified in a number of ways for different purposes. Thus, when the satellite is in orbit axis 10 is the yaw axis, the axis about which yawing motion of the satellite takes place. In addition, axis 10 is the local vertical and is thus the basis for defining local horizontal, namely at right angles to axis 10. Also, as previously stated axis 10 is the axis of minimum moment of inertia of the satellite.

In defining the conventional three orthogonal axes of angular motion of a moving body, the yaw axis 10 has already been defined. The roll axis is of course the same as the velocity vector of the satellite at any instant in its orbital motion. The velocity vector and roll axis are identified by the reference number 11. The pitch axis is the axis through the center of the satellite at right angles to both the yaw axis and the roll axis, and is identified by the reference number 12. As is well known by those skilled in the art, the dynamics of orbital motion cause the axis of maximum moment of inertia of an orbiting body to align itself normal to the orbital plane. Thus, the axis of maximum moment of inertia of the composite satellite structure coincides with the pitch axis and is given the same reference number 12.

In order to accomplish the objectives of the invention, the satellite must be constructed so that when the satellite is in orbit the damper rod 7, in equilibrium position, will be at an angle to the orbital plane 3, and that angle must be other than 90 degrees. This is another way of saying that the damper rod must be at an angle to the axis of maximum moment of inertia of other than 90 degrees. Fortunately, the forces caused by gravity and orbital motion will cause any shape satellite to be oriented with its axis of minimum moment of inertia aligned with the local vertical, and its axis of maximum moment of inertia normal to the orbital plane. Thus, the damper rod 7 can be connected to the satellite body 4 in such a position that when the satellite is in orbit the damper rod will be at an angle to the orbital plane. The desired result is achieved simply by placing the damper rod on the satellite body so that the composite satellite body and damper rod will have an axis of maximum moment of inertia 12 which is skewed to both the rod 7 and the axis of cylinder 4.

In the case of a cylindrically shaped body 4, the desired result is achieved by adding a damper rod 7 at some position other than in the plane which passes through the axis of the cylinder and through the axis of rods 5 and 6. If rod 7 were in the plane which passes through the center of the cylinder 4 and through the axis of rods 5 and 6, then both the cylinder 4 and the damper rod 7 would lie in the orbital plane and satisfactory damping would not be achieved for motion about all three of the orthogonal axes. In addition, rod 7 must be skewed with respect to the centerline of the cylinder 4.

The reason that the described type of configuration is damped about all three orthogonal axes while using only one damper rod, lies in the fact that the axis of minimum moment of inertia of the damper rod, per se, is skewed relative to the orbital plane, and the axis of maximum moment of inertia of the remainder of the satellite is skewed relative to the orbital plane. The composite symmetry relative to the orbital plane; that is, the axes satellite structure must and does of course have inertial of inertia 10 and 12 are, respectively, in and normal to the orbital plane. The result of the inertial asymmetry of the body 4 and rigidly attached rods 5 and 6 relative to the orbital plane is that oscillatory motions about all of the three orthogonal axes are strongly coupled to each other. In this way motion about one orthogonal axis will induce motion about all others. Thus, disturbance of the satellite about any of the orthogonal axes 10, 11 and 12 will result in relative motion between the damper rod 7 and the body 4. This relative motion permits removal of the disturbance energy from the satellite structure 1 by a damping connection between the rod 7 and body 4, as will now be described.

Figure 3:
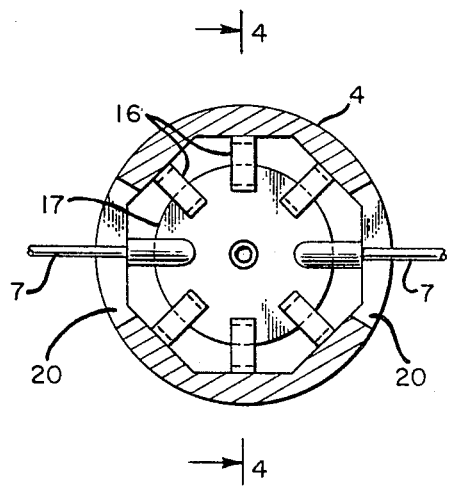
FIG. 3 is an enlarged cross sectional view through the satellite of FIG. 1 at the location of the damper rod.
Figure 4:
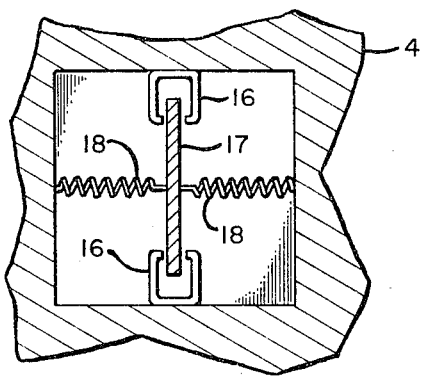
FIG. 4 is a view along the line 4—4 of FIG. 3.

Any suitable damping means can be employed to dissipate energy through relative motion of the rod 7 and body 4. One suitable arrangement comprises a circle of horseshoe magnets 16 and a metal disk 17, as shown in FIGS. 3 and 4. The magnets are bonded in a circular array inside the body 4, and the disk 17 is arranged for rotary motion so that its outer portion cuts the field across the poles of the magnets. More specifically disk 17 is mounted on a torsional flexure pivot such as a coil spring 18. Disk 17 is firmly attached to the spring 18 so that when the disk turns it will twist the spring. Alternatively, the spring 18 could be replaced by a taut wire. The damper rod 7 is integral with disk 17 and extends from opposite sides thereof through slots 20 in the wall of the body 4.

Oscillation of the satellite body 4 about any axis will cause the damper rod 7 to pivot about the axis of spring 18. This motion causes disk 17 to cut the magnetic fields of magnets 16 which of course induces an electrical current in the disk. As is well known by those skilled in the art, the induced current will generate a magnetic field, and such field will buck the fields of magnets 16. As a result, oscillation of disk 17 will be resisted and energy will be dissipated. The coil spring 18 will always bias the damper rod 7 to the equilibrium position shown in FIGS. 1 and 3.

Figure 2:
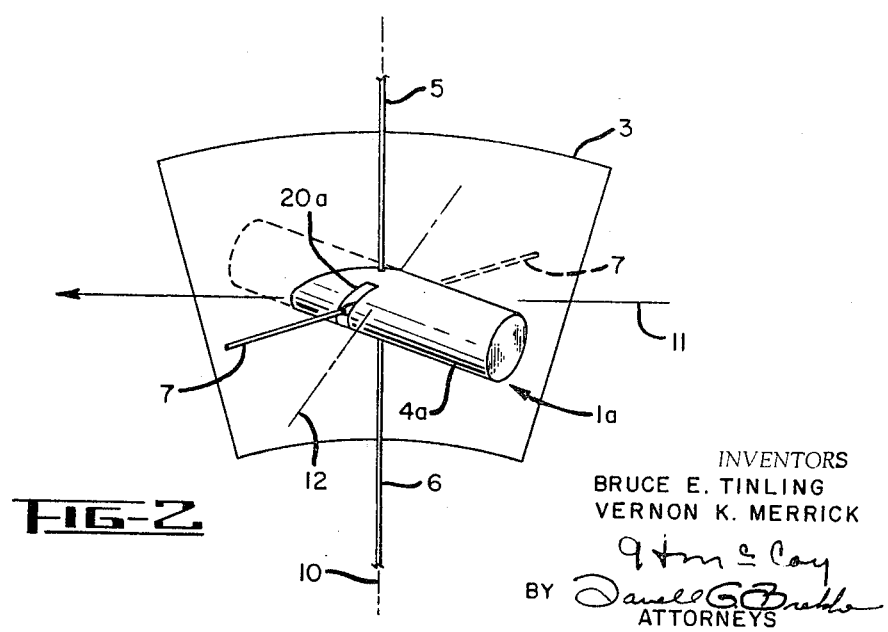
FIG. 2 is a view similar to FIG. 1 but showing a slightly modified satellite construction and omitting the earth.

As will be understood from the preceding description, the invention requires that the satellite structure, other than the damper rod or auxiliary body, have an axis of minimum moment of inertia, and an axis of maximum moment of inertia. When this condition is fulfilled a damper rod or other auxiliary body can be added such that the axis of maximum moment of inertia of the composite structure will not coincide with either the axis of maximum moment of inertia of the remainder of the satellite structure nor with any of the principal axes of inertia of the damper rod or any other auxiliary body which might be employed. In this way the satellite, other than the damper rod, will travel in orbit with its axis of maximum moment of inertia skewed to the orbital plane, and the damper rod will travel with its axis of minimum moment of inertia skewed to the orbital plane. Thus, the required inertial asymmetry is obtained so that inertial coupling results and the damper rod will move with respect to the remainder of the satellite whenever the satellite is displaced from its equilibrium position, regardless of the direction of the initial displacing torque. The cylindrical shape for the satellite body as shown in FIGS. 1, 2 and 5 is presented as one preferred embodiment because it does, together with rods 5 and 6, have well defined moments of inertia with which the rod 7 can be combined to achieve the desired composite inertial arrangement.

It should be understood that even with a preselected main body shape for the satellite, such as a cylindrical shape, practice of the invention is not limited to the exact arrangement shown in FIG. 1. For example, FIG. 1 is arranged so that the plane of oscillation of damper rod 7 is vertical and cylindrical body 4 is horizontal. A variety of other arrangements are possible and two such other arrangements are shown in FIGS. 2 and 5, wherein identical parts are identified with the same reference numbers used in FIG. 1, and slightly modified parts are identified with the same numbers plus letter suffixes. As indicated in FIG. 2 the plane of oscillation of rod 7 and therefore the line of slot 20 can be skewed to vertical as in the case of slot 20a. As a matter of fact, the plane of oscillation of rod 7 can be at any angle from vertical through horizontal and still provide damping of satellite motion about all three of the orthogonal axes 10–12. Naturally, the magnitude of damping of oscillation about each of the orthogonal axis will change depending on the specific plane of oscillation of rod 7. Thus, in a specific case the plane of oscillation of rod 7 is selected to provide the strongest damping for motion about the orthogonal axis for which the greatest disturbance is expected. Conventional mathematical techniques are available for finding the optimum plane of oscillation of rod 7 for each specific configuration, as well as the optimum value of damping torque of magnets 16 and the numerous other variables in the system.

Figure 5:
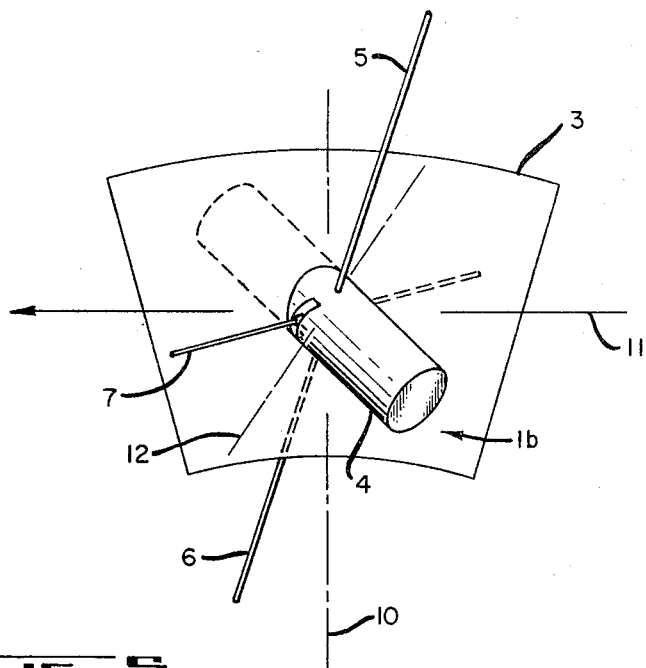
FIG. 5 is a view similar to FIG. 2 but showing another embodiment of the satellite construction.

Another possible variation for the arrangement of a system having a cylindrical main body is shown in FIG. 5. In FIG. 5 the rods 5 and 6 which form the axis of minimum moment of intertia have been attached to body 4 at an angle to the axis of body 4 of other than 90 degrees. In FIG. 1 the rods 5 and 6 are at an angle of 90 degrees to the axis of body 4. The difference is that in FIG. 1 the body 4 orbits in a position which is in the local horizontal, whereas in FIG. 5 the body 4 orbits in a position skewed to the local horizontal.

Figure 6:
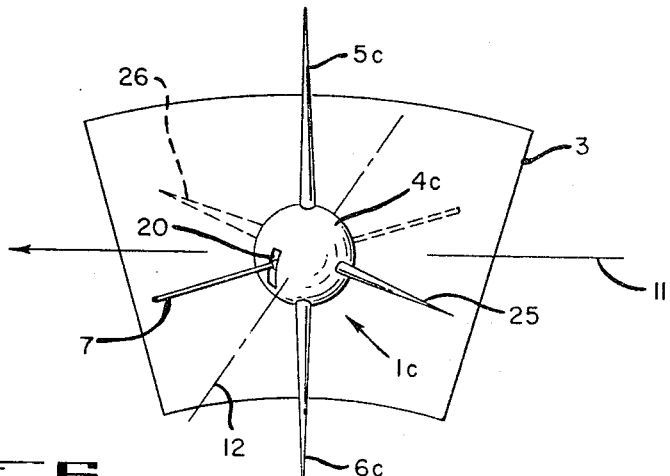
FIG. 6 is a view similar to FIG. 2 but showing the invention embodied in a spherical type of satellite.
Figure 7:
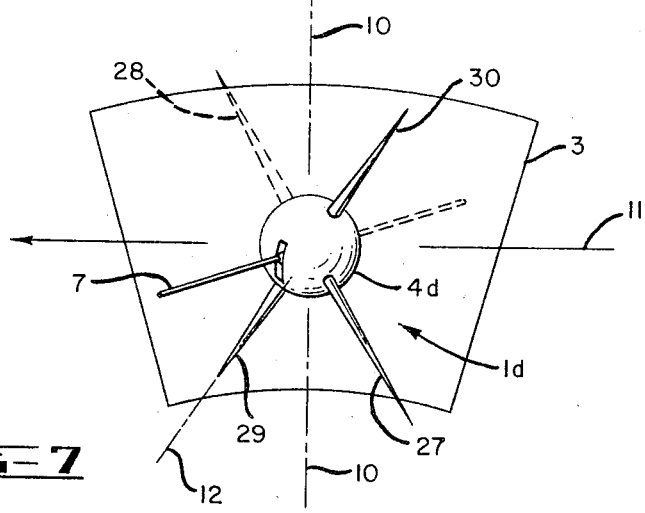
FIG. 7 is a view similar to FIG. 6 but showing a second spherical embodiment.
Figure 8:
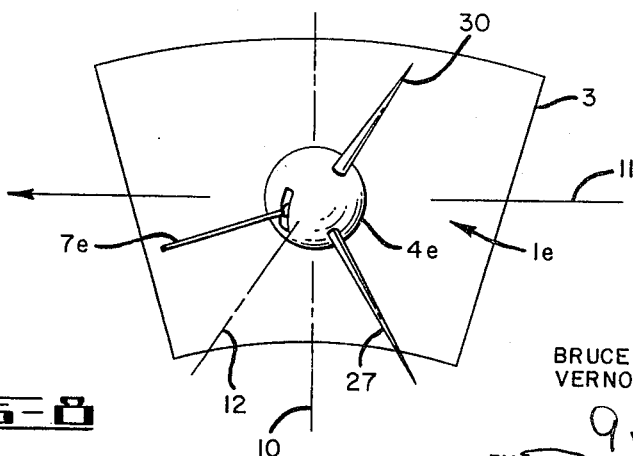
FIG. 8 is a view similar to FIG. 6 but showing a third spherical embodiment.

In some cases the payload mass of a satellite is such that it is distributed more nearly like a homogeneous sphere than like a homogeneous cylinder. FIGS. 6–8 show a variety of suitable satellite constructions employing a spherical mass distribution for the main body. Obviously, a sphere does not have any maximum or minimum axes of inertia. As a result, rods or other structures must be added so that axes for maximum and minimum moments of inertia exist.

More specifically FIG. 6 shows a satellite construction 1c comprising a spherical main body 4c. The axis of minimum moment of inertia lies along rods 5c and 6c. A sphere plus the rods 5c and 6c does not have any fixed axis of maximum moment of inertia. Therefore, rods 25 and 26 are added which results in an axis of maximum moment of inertia of the satellite structure which is normal to the plane of rods 5c, 6c, 25 and 26, before the damper rod 7 is added. Rods 25 and 26 are at right angles to rods 5c and 6c so that the inertial arrangement is similar to that in FIG. 1. The damper rod 7 in FIG. 6 is mounted on a disk 17 as in FIG. 3.

FIG. 7 shows an alternative arrangement for a spherical main body 4d in which the rigidly attached rods are oriented differently from FIG. 6. More specifically in FIG. 7 rods 27–30 are arranged in an X pattern. In this way the axis of minimum moment of inertia is made to bisect the acute angle of the X pattern. The axis of maximum moment of inertia of the structure without the damper rod 7 is normal to the plane of the X pattern. Thus, when the damper rod 7 is added at any angle to the plane of the X pattern it shifts the axis of maximum moment of inertia of the composite structure to a position which is not normal to the plane of the X pattern. In this way the damper rod and the axis of maximum moment of inertia of the composite structure to a position with respect to the axis of maximum moment of inertia of the composite structure.

FIG. 8 shows still another embodiment of the spherical configuration. In FIG. 8 the rods extend only from one side of the body. More specifically FIG. 8 employs only the axis-forming rods 27 and 30 from FIG. 7. The damper rod 7e also extends only from one side of the body 4e.

Although specific details of the present invention are shown and described herein, it is to be understood that modifications may be made therein without departing from the spirit and scope of the invention as set forth in the appended claims. For example, it should be understood that although the damper body has been specifically defined as a rod it can have a variety of other shapes. Although the principles involved in the invention have been specifically described with reference to orbit about the earth, the same principles will apply to orbit around any body having a gravitational field. In addition, it should be understood that although the invention has been specifically described with a single degree of oscillatory freedom for the damper rod 7 relative to the remaining structure, desirable results would also be obtained if rod 7 were connected for oscillation in two planes. The single degree of freedom arrangement is preferred from the standpoint of simplicity of construction.

Having thus described the invention, what is claimed as new and desired to be secured by Letters Patent is:

1. A space satellite structure comprising a composite main body portion and damping body portion, said composite satellite structure having a first axis of minimum moment of inertia and a second axis of maximum moment of inertia in a plane at right angles to said first axis, and damping means biasing said damping body portion to an equilibrium position in which said damping body portion is at an angle to said first axis and skewed with respect to said second axis.

2. A space satellite structure as claimed in claim 1 in which the mass in said satellite structure is distributed as in an elongated cylinder having its longitudinal axis in said plane and at an angle to said damping body portion, and rods rigidly attached to said cylinder and projecting from opposite sides of said cylinder along said first axis.

3. A space satellite structure as claimed in claim 1 in which the mass in said satellite structure is distributed as in a sphere, rods rigidly attached to said sphere in the form of an X with said first axis bisecting the acute angles formed by said X, and the plane of said X being skewed with respect to said second axis.

4. A space satellite structure as claimed in claim 1 in which the mass in said satellite structure is distributed as in an elongated cylinder having its longitudinal axis at an angle to said plane and at an angle to said damping body portion, and rods rigidly attached to said cylider and projecting from opposite sides of said cylinder along said first axis.

5. A space satellite structure as claimed in claim 1 in which the mass in said structure is distributed as in a sphere, rods rigidly attached to said sphere and projecting from opposite sides of the sphere along said first axis, and additional rods rigidly attached to said sphere and projecting from opposite sides of the sphere in the plane of and at an angle to said damping body portion.

6. A space satellite structure as claimed in claim 1 in which the mass in said structure is distributed as in a sphere, two rods rigidly attached to said sphere, and said first and second axes being formed entirely by said damping body portion and said two rods.

7. A structure as claimed in claim 6 in which all of said rods project from the same half of the sphere.

8. A space satellite structure comprising a first axis of minimum moment of inertia, a second axis of maximum moment of inertia in a plane at right angles to said first axis, a damper body pivotally connected to said satellite structure for oscillation in a single plane, said damper body forming part of said structure and contributing to the formation of said axes, and damping means biasing said damper body to an equilibrium position in which said body is at an angle to said first axis and at an angle other than 90 degrees to said second axis.

9. A space satellite structure as claimed in claim 8 in which said single plane is normal to said plane at right angles to the first axis.

10. A space satellite structure as claimed in claim 8 in which said single plane is at an angle other than 90 degrees to said plane at right angles to the first axis.

11. A space satellite structure comprising a main body portion having an axis of maximum moment of inertia and an axis of minimum moment of inertia, a damper body portion connected to said main portion for relative movement therebetween, and said main and damper portions being interconnected so that when said satellite is in orbit around a body having a gravitational field said axis of maximum moment of inertia of said main body portion is at an angle to the plane of said orbit other than 90 degrees.

12. A space satellite structure comprising a main body portion having an axis of maximum moment of inertia and an axis of minimum moment of inertia, a damper body portion connected to said main portion for relative movement therebetween, and said main and damper portions being interconnected so that when said satellite is in orbit around a body having a gravitational field said axis of minimum moment of inertia of said main body portion is skewed with respect to the plane of said orbit.

13. A space satellite structure comprising a main body portion having an axis of maximum moment of inertia and an axis of minimum moment of inertia, a damper body portion connected to said main portion for relative movement therebetween, and said main and damper portions being interconnected so that when said satellite is in orbit around a body having a gravitational field said damper body portion is skewed with respect to the plane of said orbit.

14. A space satellite structure comprising a main body portion having an axis of maximum moment of inertia and an axis of minimum moment of inertia, a damper body portion having an axis of minimum moment of inertia, said main body portion and said damper body portion being interconnected so that when said satellite is in orbit around a body having a gravitational field, said axis of maximum moment of inertia is skewed with respect to the plane of orbit and said axis of minimum moment of inertia of said damper body portion is skewed with respect to said orbital plane.

References Cited by the Examiner
UNITED STATES PATENTS 3,168,263  2/1965  Kamm _____ 244—1

References Cited by the Applicant
UNITED STATES PATENTS 3,030,049  4/1962  Pilkington, et al.
3,031,154  4/1962  Roberson et al.
3,104,080  9/1963  Fischell.
3,116,035  12/1963  Cutler.

OTHER REFERENCES

American Rocket Society Journal, "Vertistat; an Improved Satellite Orientation Device," June 1962, p. 911–913.

FERGUS S. MIDDLETON, *Primary Examiner.*